United States Patent
Han et al.

(10) Patent No.: US 10,101,832 B2
(45) Date of Patent: Oct. 16, 2018

(54) TOUCH SENSOR INTEGRATED TYPE DISPLAY DEVICE

(71) Applicant: LG DISPLAY CO., LTD., Seoul (KR)

(72) Inventors: Manhyeop Han, Seoul (KR); Cheolse Kim, Daegu (KR)

(73) Assignee: LG Display Co., Ltd., Seoul (KR)

( * ) Notice: Subject to any disclaimer, the term of this patent is extended or adjusted under 35 U.S.C. 154(b) by 88 days.

(21) Appl. No.: 14/547,783

(22) Filed: Nov. 19, 2014

(65) Prior Publication Data
US 2015/0185938 A1   Jul. 2, 2015

(30) Foreign Application Priority Data
Dec. 26, 2013  (KR) .................. 10-2013-0164611

(51) Int. Cl.
  G06F 3/041   (2006.01)
  G06F 3/044   (2006.01)

(52) U.S. Cl.
  CPC ............ *G06F 3/0412* (2013.01); *G06F 3/044* (2013.01); *G06F 2203/04111* (2013.01)

(58) Field of Classification Search
  None
  See application file for complete search history.

(56) References Cited

U.S. PATENT DOCUMENTS

| | | | |
|---|---|---|---|
| 7,859,521 B2 | 12/2010 | Hotelling et al. | |
| 2010/0110038 A1* | 5/2010 | Mo ........................ | G06F 3/044 345/174 |
| 2010/0193257 A1 | 8/2010 | Hotelling et al. | |
| 2010/0194697 A1* | 8/2010 | Hotelling .............. | G06F 3/0412 345/173 |
| 2010/0194698 A1* | 8/2010 | Hotelling .............. | G06F 1/3218 345/173 |
| 2010/0194699 A1* | 8/2010 | Chang .................... | G06F 3/044 345/173 |

(Continued)

FOREIGN PATENT DOCUMENTS

| CN | 102338945 A | 2/2012 |
|---|---|---|
| CN | 102341772 A | 2/2012 |

(Continued)

OTHER PUBLICATIONS

European Extended Search Report, European Application No. 14199693.4, dated Jul. 16, 2015, 6 pages.

(Continued)

*Primary Examiner* — Matthew Yeung
(74) *Attorney, Agent, or Firm* — Fenwick & West LLP

(57) ABSTRACT

A touch sensor integrated type display device includes a plurality of first areas where a plurality of first electrodes are respectively located; and a plurality of second areas where a plurality of second electrodes and a plurality of third electrodes are arranged alternately in a first direction so as to avoid contact with each other. The plurality of first electrodes located in the plurality of first areas are connected to each other in the first direction, the plurality of second electrodes located in the plurality of second areas are connected to each other in the first direction, and the plurality of third electrodes located in the plurality of second areas are arranged in a second direction crossing the first direction.

17 Claims, 11 Drawing Sheets

(56) References Cited

U.S. PATENT DOCUMENTS

| | | | |
|---|---|---|---|
| 2011/0242027 A1* | 10/2011 | Chang | G06F 3/0412 345/173 |
| 2013/0169587 A1 | 7/2013 | Kim et al. | |
| 2013/0265282 A1 | 10/2013 | Nakagawa et al. | |
| 2013/0278557 A1 | 10/2013 | Hotelling et al. | |
| 2013/0328812 A1 | 12/2013 | Kim et al. | |
| 2014/0306916 A1* | 10/2014 | Wang | G06F 3/041 345/173 |

FOREIGN PATENT DOCUMENTS

| | | | |
|---|---|---|---|
| CN | 102466907 | A | 5/2012 |
| CN | 103049155 | A | 4/2013 |
| EP | 2391994 | A | 12/2011 |
| JP | 2012-517049 | A | 7/2012 |
| KR | 10-2011-0113650 | | 10/2011 |
| TW | 201250560 | A | 12/2012 |
| TW | 201321834 | A | 6/2013 |
| TW | 201329814 | A | 7/2013 |
| WO | WO 2012/077576 | A1 | 6/2012 |

OTHER PUBLICATIONS

Taiwan Office Action, Taiwan Application No. 103144603, dated Jan. 14, 2016, 11 pages.
Japanese Office Action, Japanese Application No. 2014-255045, dated Feb. 25, 2016, 8 pages.
Chinese First Office Action, Chinese Application No. 201410799017. 8, dated Mar. 31, 2017, 16 pages.

* cited by examiner

TOUCH SENSOR INTEGRATED TYPE DISPLAY DEVICE

This application claims the benefit of priority under 35 U.S.C. § 119(a) to Korean Patent Application No. 10-2013-0164611 filed on Dec. 26, 2013, which is incorporated by reference herein in its entirety.

BACKGROUND

Field

This document relates to a touch sensor integrated type display device which is capable of recognizing a user's touch.

Related Art

Recently, various input devices such as a keyboard, a mouse, a trackball, a joystick, and a digitizer have been used to configure an interface between users and home appliances or various kinds of information communication equipment. However, such input devices as a keyboard, a mouse, etc require the user to learn to use them and take up space. Therefore, the demand for input devices that are convenient, easy to use, and reduce erroneous operations is growing more and more. In response to this demand, a touch sensor for enabling a user to input information by directly touching the screen with their hand or a pen was suggested.

The touch sensor is simple to use, has less malfunctions, and enables the user to input without using an additional input device. In addition, the touch sensor can be applied to various display devices because it enables the user to operate it quickly and easily through content displayed on the screen.

Touch sensors can be classified into add-on type and on-cell type. In the add-on type, a display device and a touch panel having a touch sensor are separately manufactured, and the touch panel is attached onto an upper substrate of the display device. In the on-cell type, a touch sensor is directly formed on the surface of an upper glass substrate of a display device.

However, the add-on type sensor has a structure in which the completed touch panel is mounted on the display device and has various problems, such as increased thickness or reduced visibility due to low brightness of the display device.

In addition, the on-cell type touch sensor has a structure in which a touch panel is formed on the upper surface of the display device and can have a reduced thickness compared to the add-on type but still has the problem of the increase in entire thickness due to a driving electrode layer, a sensing electrode layer, and an insulation layer for insulating the driving electrode layer and the sensing electrode layer, which constitute the touch sensor. As such, the number of processes and the manufacturing cost in the on-cell type touch sensor is increased.

One solution to the problem described hereinabove can be found in U.S. Pat. No. 7,859,521, titled "touch sensor integrated type display device."

The touch sensor integrated type display device disclosed in U.S. Pat. No. 7,859,521 measures the amount of change in electrostatic capacitance caused by a touch and recognizes the presence or absence of a touch and a touch position by dividing common electrodes for display to use them as touch driving electrodes and touch sensing electrodes.

With the configuration of U.S. Pat. No. 7,859,521, electrodes performing the same function are connected to each other by wires in a non-contact manner because the touch driving electrodes and the touch sensing electrodes are formed on the same layer. That is, the touch driving electrodes are connected to touch driving electrode connecting wires via driving electrode contact holes, and the touch sensing electrodes are connected to each other by touch sensing electrode connecting wires via sensing electrode contact holes. Hence, the touch driving electrodes and the touch sensing electrodes are not in electrical contact with each other.

However, the touch sensor integrated type display device disclosed in U.S. Pat. No. 7,859,521 has a complicated structure where both the touch driving electrodes and the touch sensing electrodes are formed on a single layer of common electrodes for display and have separate wires for connecting the divided driving electrodes and contact holes for connecting these wires.

As such, the conventional touch sensor integrated type display device has the problems of complex design and degradation of display characteristics because of different types of display pixels arranged within a unit touch electrode in a complicated manner.

SUMMARY

An aspect of this document is to provide a touch sensor integrated type display device which avoids degradation of display characteristics by forming complex wires for touch driving electrodes and touch sensing electrodes in a simple and efficient way.

Another aspect of this document is to provide a touch sensor integrated type display device which can achieve high aperture ratios by eliminating contact holes for connecting touch driving electrode wires and touch sensing electrode wires.

Yet another aspect of this document is to provide a touch sensor integrated type display device which can improve touch performance by reducing the parasitic capacitance between signal wires and touch electrodes, as well as the electrostatic capacitance between touch driving electrodes and touch sensing electrodes.

A further aspect of this document is to provide a touch sensor integrated type display device which can increase stability by cutting off external static electricity.

In one aspect, there is a touch sensor integrated type display device comprising a plurality of first areas where a plurality of first electrodes are respectively located; and a plurality of second areas where a plurality of second electrodes and a plurality of third electrodes are arranged alternately in a first direction so as to avoid contact with each other, wherein the plurality of first electrodes located in the plurality of first areas are connected to each other in the first direction, the plurality of second electrodes located in the plurality of second areas are connected to each other in the first direction, and the plurality of third electrodes located in the plurality of second areas are arranged in a second direction crossing the first direction.

A size of the first area is equal to or n times than that of the second area.

Two first areas are located between the plurality of first areas, the first electrodes located in the two first areas are connected to each other to a touch routing wire, and the second electrodes located in the second areas are connected to each other and grounded.

The plurality of first electrodes located in the plurality of first areas are connected to each other via a plurality of first connecting wires which are arranged to be in contact with the plurality of first electrodes, and the plurality of second electrodes located in the plurality of second areas are connected to each other via a plurality of second connecting wires which are arranged to be in contact with the second electrodes.

The plurality of third electrodes located in the plurality of second areas are connected to each other to form at least two electrically separated groups via a plurality of third connecting wires which are arranged to be in contact with the third electrodes, and the plurality of third connecting wires are arranged to cross the first and second connecting wires.

The plurality of first areas and the plurality of second areas are arranged alternately, and the first areas are larger in size that the second areas.

The plurality of first electrodes located in the plurality of first areas are connected to each other to a touch routing wire, and the plurality of second electrodes located in the plurality of second areas are connected to each other and grounded.

The plurality of first connection wires connected to the plurality of first electrodes located in the plurality of first areas which are located between the plurality of second areas are connected to each other via a fourth connecting wire, and the plurality of second connection wires connected to the plurality of second electrodes located in the plurality of second areas are connected to each other via a fifth connecting wire.

The plurality of third connection wires connected to the plurality of third electrodes located in the plurality of second areas are connected to each other to form at least two electrically separated groups via a sixth connecting wire, and the sixth connecting wire is arranged to cross the fourth and fifth connecting wires.

The plurality of first electrodes are touch driving electrodes also serving as common electrodes, the plurality of second electrodes are touch non-sensing electrodes also serving as common electrodes, and the plurality of third electrodes are touch sensing electrodes.

The plurality of first electrodes are touch sensing electrodes also serving as common electrodes, the plurality of second electrodes are touch non-driving electrodes also serving as common electrodes, and the plurality of third electrodes are touch driving electrodes.

The touch sensor integrated type display device further includes at least one unit pixel electrode that overlaps each of the first and second electrodes, the unit pixel electrode including a plurality of subpixel electrodes for representing colors.

A touch sensor integrated type display device according to the present disclosure has the advantage of facilitating the design of touch driving electrodes, touch sensing electrodes, and wiring which constitute a touch sensor, in conformity with the design of unit pixel electrodes, gate lines, and data lines of the display device.

Furthermore, the touch sensor integrated type display device according to the present disclosure has the advantage of being beneficial to high-resolution products and large-area products by improvement in aperture ratios because no contact holes for connecting touch driving electrodes and touch sensing electrodes are needed.

Furthermore, the touch sensor integrated type display device according to the present disclosure has the advantage of improving touch performance since touch sensing electrodes are not located in a touch driving area and electrostatic capacitance and parasitic capacitance therefore can be decreased due to the reduction in the number of touch sensing electrodes.

Furthermore, the touch sensor integrated type display device according to the present disclosure has the advantage of increasing the stability of the device because static electricity coming from outside can be cut off by connecting touch driving electrodes and touch sensing electrodes to an electrostatic discharge circuit.

BRIEF DESCRIPTION OF THE DRAWINGS

The accompanying drawings, which are included to provide a further understanding of the disclosure and are incorporated in and constitute a part of this specification, illustrate embodiments and together with the description serve to explain the principles of the disclosure. In the drawings.

DETAILED DESCRIPTION

Figure 1:
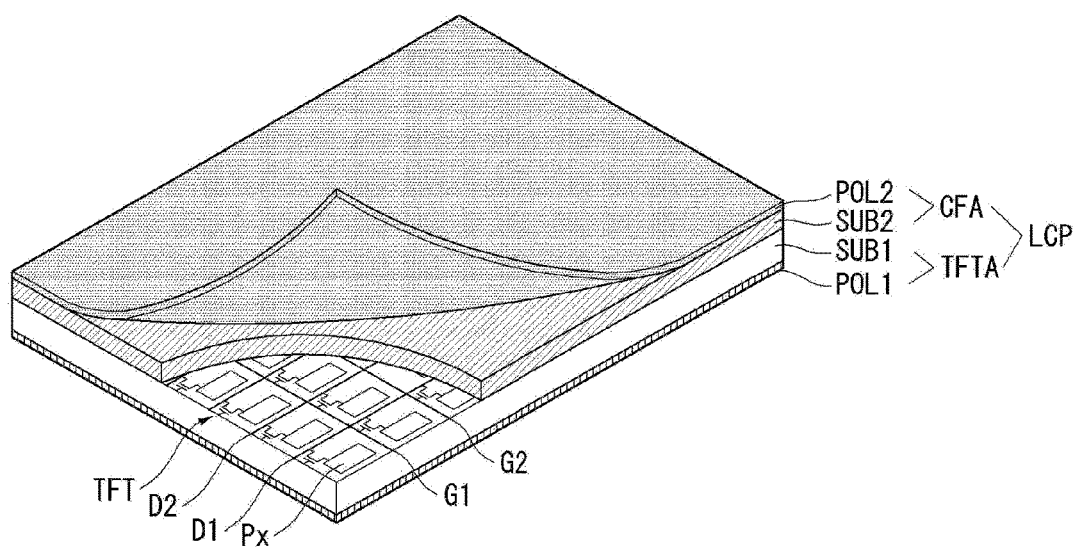
FIG. 1 is a partial block diagram schematically showing a touch sensor integrated type display device according to exemplary embodiments.

Hereinafter, exemplary embodiments will be described in detail with reference to the accompanying drawings, wherein same reference numerals may be used to denote the same or substantially the same elements throughout the specification and the drawings.

Figure 2:
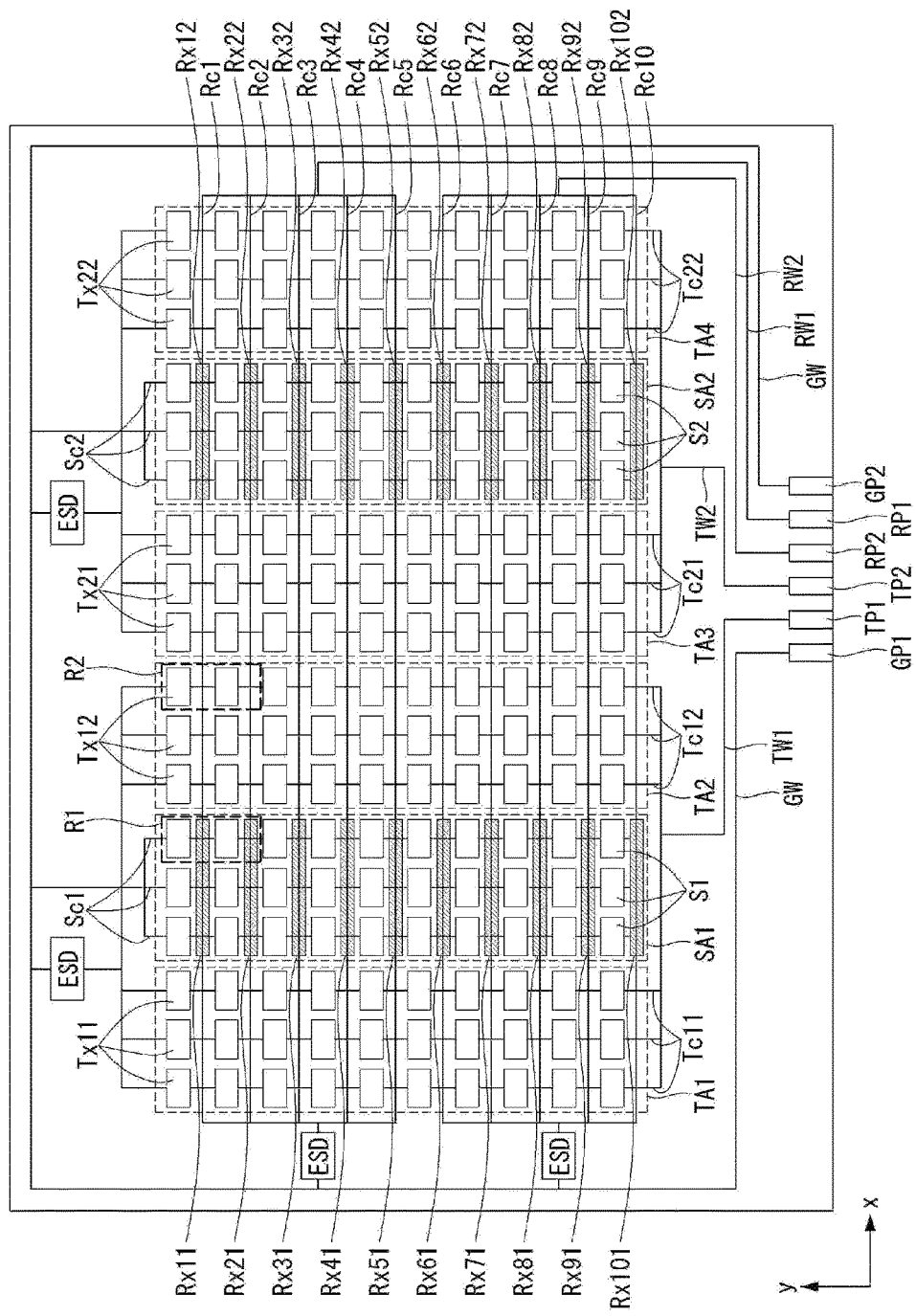
FIG. 2 is a top plan view schematically illustrating a touch sensor integrated type display device according to a first exemplary embodiment.

A touch sensor integrated type display device according to a first exemplary embodiment is described in detail with reference to FIGS. 1 and 2. FIG. 1 is a partial block diagram schematically showing a touch sensor integrated type display device according to exemplary embodiments. FIG. 2 is a top plan view schematically illustrating a touch sensor integrated type display device according to a first exemplary embodiment.

Referring to FIG. 1, a touch sensor integrated type display device according to exemplary embodiments comprises a liquid crystal display panel LCP including a color filter array CFA and a thin film transistor array TFTA with a liquid crystal layer (not shown) interposed therebetween.

The thin film transistor array TFTA comprises a plurality of gate lines G1 and G2 which are formed in parallel on a first substrate SUB1 in a first direction (for example, x-axis direction), a plurality of data lines D1 and D2 which are formed in parallel in a second direction (for example, y-axis direction) to cross over the plurality of gate lines G1 and G2, liquid crystal cells positioned in areas defined by the crossings of the gate lines G1 and G2 and the data lines D1 and D2, thin film transistors TFT formed at the crossings of the gate lines G1 and G2 and the data lines D1 and D2, a plurality of pixel electrodes Px for charging a data voltage to liquid crystal cells, and common electrodes (not shown) disposed to form an electrical field with the plurality of pixel electrodes Px.

The color filter array CFA comprises a black matrix and color filters (not shown) formed on a second substrate SUB2. Polarizing plates POL1 and POL2 are respectively attached to outer surfaces of the first substrate SUB1 and second substrate SUB2 of the liquid crystal display panel LCP. Alignment layers (not shown) for setting a pre-tilt angle of liquid crystals are respectively formed on inner surfaces of the first substrate SUB1 and the second substrate SUB2 contacting the liquid crystals. A column spacer may be formed between the first substrate SUBS1 and second substrate SUBS2 of the liquid crystal display panel LCP to maintain cell gaps of the liquid crystal cells.

The common electrodes are formed on the second substrate SUB2 in a vertical electric field driving manner such as a twisted nematic (TN) mode and a vertical alignment (VA) mode. The common electrodes COM are formed on the first substrate SUB1 along with the pixel electrodes Px in a horizontal electric field driving manner such as an in-plane switching (IPS) mode and a fringe field switching (FFS) mode. In the exemplary embodiment, the common electrodes COM in the horizontal electric field driving manner are described as an example.

Referring to FIG. 2, common electrodes COM of the touch sensor integrated type display device according to the first exemplary embodiment of the present invention comprise a plurality of electrodes Tx11, Tx12, Tx21, TX22, S1, and S2 divided in the first direction (e.g., along the x axis) and the second direction (e.g., along the y axis). In the embodiment shown in FIG. 2, the divided common electrodes comprise four groups, i.e., first to four groups of touch driving electrodes Tx11, Tx12, Tx21, and Tx22 and two groups, i.e., first and second groups of touch non-sensing electrodes S1 and S2. The first to fourth groups of touch driving electrodes Tx11, Tx12, Tx21, and Tx22 are respectively located in first to fourth touch driving areas TA1 to TA4, and the first and second groups of touch non-sensing electrodes S1 and S2 are respectively located in first and second touch sensing areas SA1 and SA2. The first touch sensing area SA1 is located between the first and second touch driving areas TA1 and TA2, and the second touch sensing area SA2 is located between the third and fourth touch driving areas TA3 and TA4. The second touch driving area TA2 and the third touch driving area TA3 are located adjacent to each other. With this configuration, the second and third touch driving areas TA2 and TA3 are located between the first and second touch sensing areas SA1 and SA2.

Ten rows and three columns of 1-1 touch driving electrodes Tx11 are located in the first touch driving area TA1 are to form a first group of touch driving electrodes Tx11. Touch driving electrode connecting wires contacting the three columns of 1-1 touch driving electrodes Tx11 are arranged along the y axis in the first touch driving area TA1. That is, three columns of 1-1 touch driving electrode connecting wires Tc11 respectively contacting the three columns of 1-1 touch driving electrodes Tx11 are arranged along the y axis.

Ten rows and three columns of 1-2 touch driving electrodes Tx12 are located in the second touch driving area TA2 to form a second group of touch driving electrodes Tx12. Touch driving electrode connecting wires contacting the three columns of 1-2 touch driving electrodes Tx12 are arranged along the y axis in the second touch driving area TA2. That is, three columns of 1-2 touch driving electrode connecting wires Tc12 respectively contacting the three columns of 1-2 touch driving electrodes Tx12 are arranged along the y axis.

Ten rows and three columns of 2-1 touch driving electrodes Tx21 are located in the third touch driving area TA3 to form a third group of touch driving electrodes Tx21. Touch driving electrode connecting wires contacting the three columns of 2-1 touch driving electrodes Tx21 are arranged along the y axis in the third touch driving area TA3. That is, three columns of 2-1 touch driving electrode connecting wires Tc21 respectively contacting the three columns of 2-1 touch driving electrodes Tx21 are arranged along the y axis.

Ten rows and three columns of 2-2 touch driving electrodes Tx22 are located in the fourth touch driving area TA4 to form a fourth group of touch driving electrodes Tx22. Touch driving electrode connecting wires contacting the three columns of 2-2 touch driving electrodes Tx22 are arranged along the y axis in the fourth touch driving area TA4. That is, three columns of 2-2 touch driving electrode connecting wires Tc22 respectively contacting the three columns of 2-2 touch driving electrodes Tx22 are arranged along the y axis.

Ten rows and three columns of first touch non-sensing electrodes S1 are located in the first touch sensing area SA1 to form a first group of touch non-sensing electrodes S1. First touch non-sensing electrode connecting wires contacting the three columns of first touch non-sensing electrodes S1 are arranged along the y axis in the first touch sensing area SA1. That is, three columns of first touch non-sensing electrode connecting wires Sc1 respectively contacting the three columns of first touch non-sensing electrodes S1 are arranged along the y axis. Also, the ten rows of first touch non-sensing electrodes S1 alternate with ten rows of first touch sensing electrodes Rx11, Rx21, Rx31, . . . , Rx101 in the first touch sensing area SA1, and first to tenth touch sensing electrode connecting wires Rc1 to Rc10 respectively contacting the ten rows of first touch sensing electrodes Rx11, Rx21, Rx31, . . . , Rx101 are arranged along the x axis.

Ten rows and three columns of second touch non-sensing electrodes S2 are located in the second touch sensing area SA2 to form a second group of touch non-sensing electrodes S2. Second touch non-sensing electrode connecting wires contacting the three columns of second touch non-sensing electrodes S2 are arranged along the y axis in the second touch sensing area SA2. That is, three columns of second touch non-sensing electrode connecting wires Sc2 respectively contacting the three columns of second touch non-sensing electrodes S2 are arranged along the y axis. Also, the ten rows of second touch non-sensing electrodes S2 alternate with ten rows of second touch sensing electrodes Rx12, Rx22, Rx32, . . . , Rx102 in the second touch sensing area SA2, and the first to tenth touch sensing electrode connecting wires Rc1 to Rc10 respectively contacting the ten rows of second touch sensing electrodes Rx12, Rx22, Rx32, . . . , Rx102 are arranged along the x axis.

As shown in FIG. 2, the first to tenth touch sensing electrode connecting wires Rc1 to Rc10 arranged to extend from the first and second touch sensing areas SA1 and SA2 to the first to fourth touch driving electrodes TA1 to TA4, and disposed to cross over the 1-1, 1-2, 2-1, and 2-2 touch driving electrode connecting wires Tc11, Tc12, Tc21, and Tc22 within the first to fourth touch driving areas TA1 to TA4.

With the configuration of FIG. 2, the 1-1 touch driving electrodes Tx11 located in the first touch driving area TA1 and the 1-2 touch driving electrodes Tx12 located in the second touch driving area TA2 are connected to a first touch driving routing wire TW1 via a wire that interconnects ends of the 1-1 touch driving electrode connecting wires Tc11 contacting the 1-1 touch driving electrodes Tx11 and ends of the 1-2 touch driving electrode connecting wires Tc12 contacting the 1-2 touch driving electrodes Tx12. The other ends of the 1-1 touch driving electrode connecting wires Tc11 and the other ends of the 1-2 touch driving electrode connecting wires Tc12 are connected to each other and then connected to a ground wire GW via an electrostatic discharge circuit ESD.

Likewise, the 2-1 touch driving electrodes Tx21 located in the third touch driving area TA3 and the 2-2 touch driving electrodes Tx22 located in the fourth touch driving area TA4 are connected to a second touch driving routing wire TW2 via a wire that interconnects ends of the 2-1 touch driving electrode connecting wires Tc21 contacting the 2-1 touch driving electrodes Tx21 and ends of the 2-2 touch driving electrode connecting wires Tc22 contacting the 2-2 touch driving electrodes Tx22. The other ends of the 2-1 touch driving electrode connecting wires Tc21 and the other ends of the 2-2 touch driving electrode connecting wires Tc22 are connected to each other and then connected to the ground wire GW via another electrostatic discharge circuit ESD.

The first and second touch driving routing wires TW1 and TW2 are connected to first and second touch driving routing pads TP1 and TP2, respectively, and supply a touch driving voltage to the 1-1 and 1-2 touch driving electrodes Tx11 and Tx12 and the 2-1 and 2-2 touch driving electrodes Tx21 and Tx22.

In the embodiment shown in FIG. 2, touch driving electrodes are illustrated taking as an example a first touch driving line including the 1-1 and 1-2 touch driving electrodes Tx11 and Tx12 and the 1-1 and 1-2 driving electrode connecting wires Tc11 and Tc12 and a second touch driving line including the 2-1 and 2-2 touch driving electrodes Tx21 and Tx22 and the 2-1 and 2-2 driving electrode connecting wires Tc21 and Tc22. The embodiment shown in FIG. 2 is merely exemplary, and the number of touch driving lines may be determined as needed by adjusting the number of touch driving electrode connecting lines connected by a connecting portion.

The first touch non-sensing electrodes S1 located in the first touch sensing area SA1 are connected to the ground wire GW by a connecting portion that interconnects ends of the first touch non-sensing electrode connecting wires Sc1 contacting the first touch non-sensing electrodes S1. The second touch non-sensing electrodes S2 located in the second touch sensing area SA2 are connected to the ground wire GW after ends of the second touch non-sensing electrode connecting wires Sc2 contacting the second touch non-sensing electrodes S2 are interconnected.

The first to fifth touch sensing electrodes Rx11 and Rx12; Rx21 and Rx22; Rx31 and Rx32; Rx41 and Rx42; and Rx51 and Rx52 are connected to a first touch sensing routing wire RW1 by a connecting portion that interconnects ends of the first to fifth touch sensing electrode connecting wires Rc1 to Rc5 contacting the first to fifth touch sensing electrodes Rx11 and Rx12; Rx21 and Rx22; Rx31 and Rx32; Rx41 and Rx42; and Rx51 and Rx52. The other ends of the first to fifth touch sensing electrode connecting wires Rc1 to Rc5 are connected together and then connected to the ground wire GW via yet another electrostatic discharge circuit ESD.

The sixth to tenth touch sensing electrodes Rx61 and Rx62; Rx71 and Rx72; Rx81 and Rx82; Rx91 and Rx92; and Rx101 and Rx102 are connected to a second touch sensing routing wire RW2 by a connecting wire that interconnects ends of the sixth to tenth touch sensing electrode connecting wires Rc6 to Rc10 contacting the sixth to tenth touch sensing electrodes Rx61 and Rx62; Rx71 and Rx72; Rx81 and Rx82; Rx91 and Rx92; and Rx101 and Rx102. The other ends of the sixth to tenth touch sensing electrode connecting wires Rc6 to Rc10 are connected together and then connected to the ground wire GW via a further electrostatic discharge circuit ESD.

The first and second touch sensing routing wires RW1 and RW2 are respectively connected to first and second touch sensing routing pads RP1 and RP2, and supply a sensing voltage from the first to fifth touch sensing electrodes Rx11 and Rx12; Rx21 and Rx22; Rx31 and Rx32; Rx41 and Rx42; and Rx51 and Rx52 and the sixth to tenth touch sensing electrodes Rx61 and Rx62; Rx71 and Rx72; Rx81 and Rx82; Rx91 and Rx92; and Rx101 and Rx102 to a touch processor (not shown) via the first to tenth touch sensing electrode connecting wires Rc1 to Rc5 and Rc6 to Rc10.

In the embodiment shown in FIG. 2, touch sensing electrodes are illustrated taking as an example two touch sensing lines including a first touch sensing line including the first to fifth touch sensing electrodes Rx11 and Rx12; Rx21 and Rx22; Rx31 and Rx32; Rx41 and Rx42; and Rx51 and Rx52 and the fifth to fifth touch sensing electrode connecting wires Rc1 to Rc5 and a second touch sensing line including the sixth to tenth touch sensing electrodes Rx61 and Rx62; Rx71 and Rx72; Rx81 and Rx82; Rx91 and Rx92; and Rx101 and Rx102 and the sixth to tenth touch sensing electrode connecting wires Rc6 to Rc10. The embodiment shown in FIG. 2 is merely exemplary, and the number of touch sensing lines may be determined as needed by adjusting the number of touch sensing electrode connecting lines connected by a connecting portion.

Both of the above-explained touch driving electrodes Tx11 and Tx12; and Tx21 and Tx22 and the touch non-sensing electrodes S1 and S2 also function as common electrodes COM. In a horizontal electrical field type display device, these electrodes are formed, along with pixel electrodes Px, on the first substrate SUB1 of the thin film transistor array TFTA, and the pixel electrodes Px are formed in areas defined by the crossings of the gate lines and the data lines.

The touch driving electrodes Tx11 and Tx12; and Tx21 and Tx22 and the touch non-sensing electrodes S1 and S2 both functioning as common electrodes COM are formed to correspond to unit pixel electrodes, respectively, (each including a plurality of subpixels used to represent colors: three subpixels according to one embodiment)

Figure 3A:
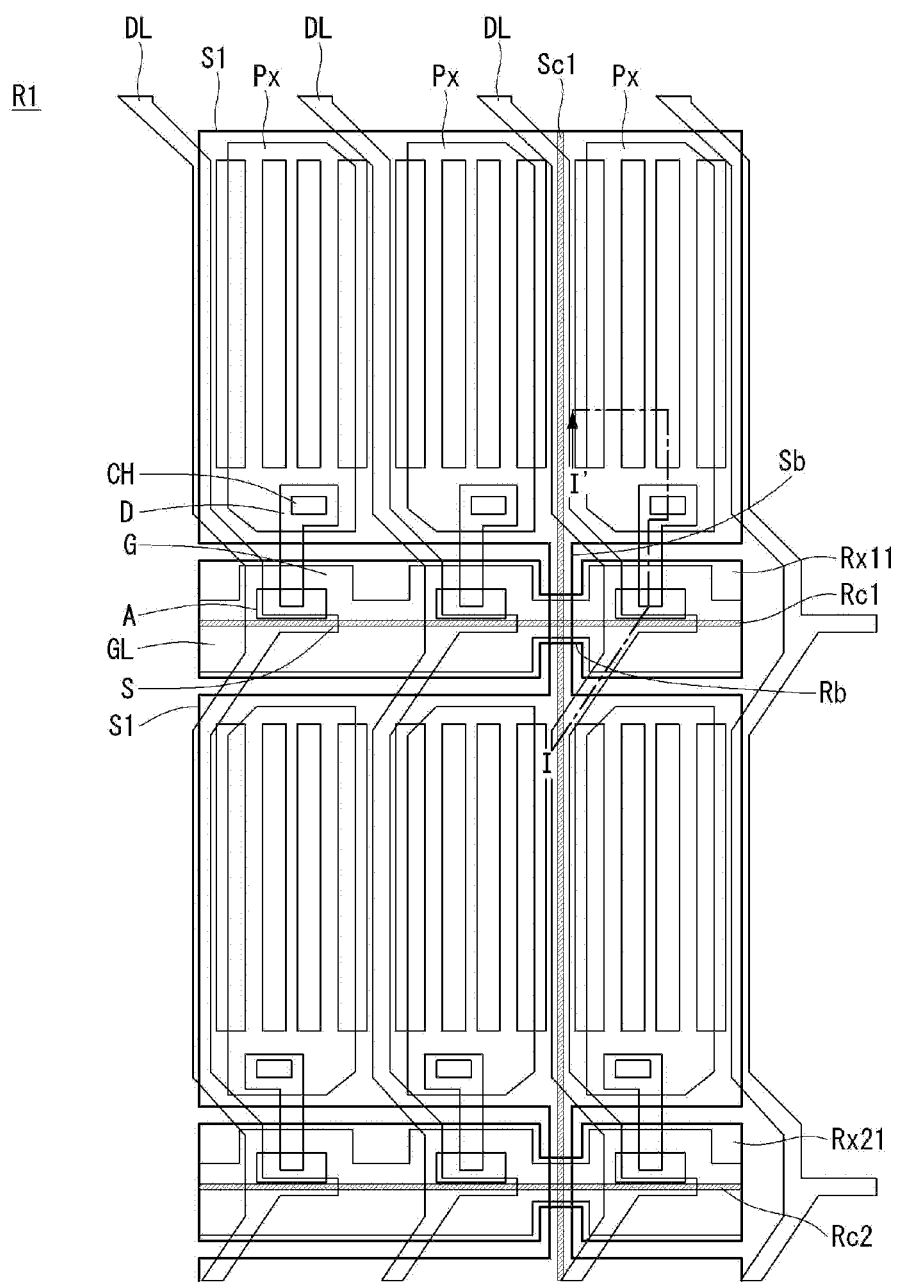
FIG. 3A is a top plan view illustrating an example where common electrodes overlie pixel electrodes in the area R1 of FIG. 2.
Figure 3B:
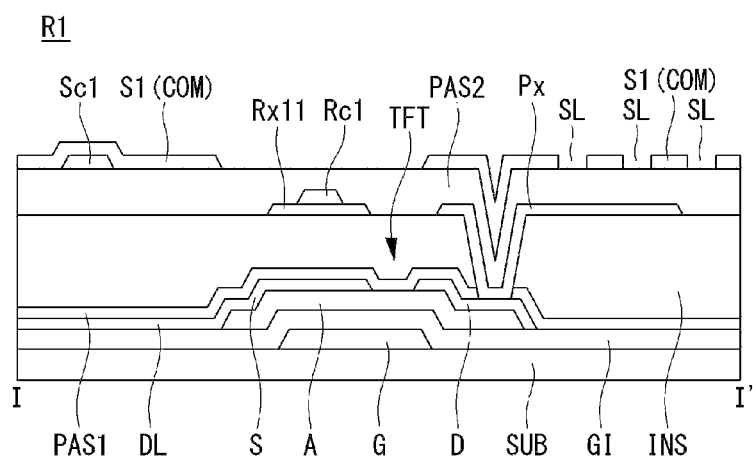
FIG. 3B is a cross-sectional view taken along the line I-I' of FIG. 3A.

Next, referring to FIGS. 3A and 3B, the touch sensor integrated type display device according to the first exemplary embodiment will be described with an example where common electrodes (touch non-sensing electrodes) overlie pixel electrodes in the touch sensing areas SA1 and SA2. FIG. 3A is a top plan view illustrating an example where common electrodes (touch non-sensing electrodes) overlie pixel electrodes in the area R1 of FIG. 2. FIG. 3B is a cross-sectional view taken along the line I-I' of FIG. 3A.

For the sake of simplicity, the following description will be given focusing on pixel electrodes Px located in the area R1 comprising part of two touch non-sensing electrodes S1 and part of two touch sensing electrodes Rx11 and Rx21 adjacent to the part of two touch non-sensing electrode patterns S1. In the drawings of this embodiment, Px refers to subpixels used to represent colors, and three subpixels constituting a unit pixel electrode are taken as an example. In the following description, subpixel electrodes constituting a unit pixel electrode will be simply referred to as pixel electrodes.

Referring to FIG. 2 and FIGS. 3A and 3B, the touch sensor integrated type display device according to the first exemplary embodiment comprises gate lines GL and data lines DL formed on substrate SUB1 of a thin film transistor array TFTA to cross over each other, thin film transistors TFTs formed at crossings of the gate lines GL and the data lines DL, pixel electrodes Px formed in areas which are defined by crossings of the gate lines GL and the data lines DL, and common electrodes COM positioned opposite the pixel electrodes Px. In the first exemplary embodiment, the common electrodes COM also serve as touch non-sensing electrodes S1. Accordingly, the common electrodes COM are also referred to as touch non-sensing electrodes S1, touch non-sensing electrodes S1 also serving as common electrodes, or common electrodes COM also serving as touch non-sensing electrodes as appropriate.

In this configuration, a gate line G is formed on a substrate SUB, and a gate insulation layer GI is formed on top of the gate line GL. An active layer A, a source electrode S, and a drain electrode D which constitute a thin film transistor TFT are formed on the gate insulation layer GI.

The thin film transistor TFT comprises a gate electrode G extending from the gate line GL formed on the substrate SUB, an active layer A formed in an area corresponding to the gate electrode G on a gate insulation layer GI covering the gate line GL and the gate electrode G, a source electrode S that extends from a data line DL formed on the gate insulation layer GI and split to expose part of the active layer A, and a drain electrode D.

Although this embodiment has been described with respect to a thin film transistor having a gate bottom structure where a gate electrode is formed under source/drain electrodes, the present disclosure is not limited thereto and it should be understood that the present disclosure also involves a thin film transistor having a gate top structure where a gate electrode is formed over source/drain electrodes. The thin film transistor having a gate top structure is a well-known component, so a detailed description thereof will be omitted.

A first passivation layer PAS1 for covering the thin film transistor TFT and the data line DL is formed on the gate insulating layer GI where the thin film transistor TFT and the data line DL are formed. An organic insulation layer INS such as photoacryl for planarization is formed on the first passivation layer PAS1. Contact holes CH are formed in the organic insulation layer INS and the first passivation layer PAS1 to expose part of the drain electrodes D.

Pixel electrodes Px are formed on the organic insulation layer INS in pixel areas defined by the crossings of data lines DL and gate lines GL. The pixel electrodes Px are brought into contact with the drain electrodes D of the thin film transistors TFT via the contact holes CH passing through the organic insulation layer INS and the first passivation layer PAS1. A touch sensing electrode Rx11 is formed in parallel with the gate lines GL on the organic insulation layer INS, and located between pixel electrodes Px adjacent to each other along the y axis. The touch sensing electrode Rx11 comprises a bottleneck portion Rb which is narrow in width in the region crossing a bottleneck portion Sb for touch non-sensing electrode S1 to be described later. A touch sensing electrode connecting wire Rc1 is formed in parallel with the gate line GL on the touch sensing electrode Rx11.

A second passivation layer PAS2 is formed on the organic insulation layer INS where the pixel electrodes Px, the touch sensing electrode Rx11, and the touch sensing electrode connecting wire Rc1 are formed.

A touch non-sensing electrode connecting wire Sc1 is formed on the second passivation layer PAS2 to overlap a data line DL. The touch non-sensing electrode connecting wire Sc1 is disposed to pass through the bottleneck portion Rb of the touch sensing electrode Rx11.

Touch non-sensing electrodes S1 also serving as common electrodes are formed on the second passivation layer PAS2 where the touch non-sensing electrode connecting wire Sc1 is formed, in order to cover the touch non-sensing electrode connecting wire Sc1. The touch non-sensing electrodes S1 overlap the pixel electrodes Px. Each of the touch non-sensing electrodes S1, to which a common voltage is supplied, comprises a plurality of slits SL to facilitate the formation of a horizontal electric field between the pixel electrodes Px during a display driving operation. Accordingly, while the pixel electrodes Px formed on the organic insulation layer INS are configured to have no slits, the touch non-sensing electrodes S1 formed on the second passivation layer PAS2 are configured to have slits.

Figure 4A:
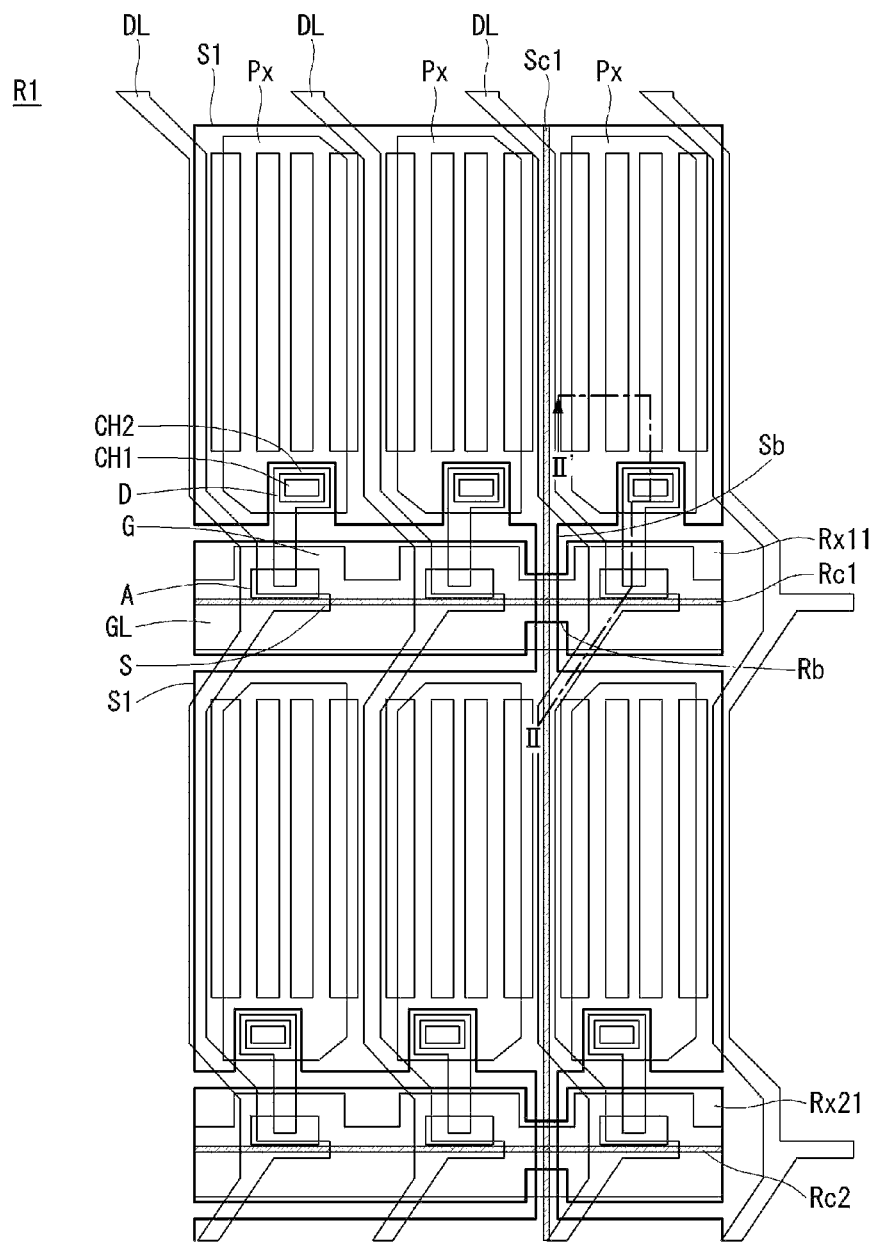
FIG. 4A is a top plan view illustrating an example where pixel electrodes overlie common electrodes (touch non-sensing electrodes) in the area R1 of FIG. 2.
Figure 4B:
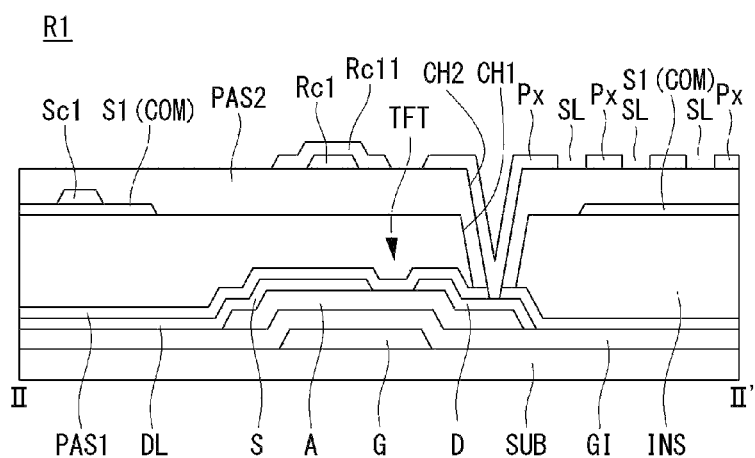
FIG. 4B is a cross-sectional view taken along the line II-II' of FIG. 4A.

Next, referring to FIGS. 4A and 4B, a touch sensor integrated type display device according to a modification of the first exemplary embodiment will be described with an example where pixel electrodes overlie common electrodes (touch non-sensing electrodes) in the touch sensing areas SA1 and SA2. FIG. 4A is a top plan view illustrating an example where pixel electrodes overlie common electrodes (touch non-sensing electrodes) in the area R1 of FIG. 2. FIG. 4B is a cross-sectional view taken along the line II-II' of FIG. 4A.

Referring to FIG. 2 and FIGS. 4A and 4B, the touch sensor integrated type display device according to the modification of the first exemplary embodiment comprises gate lines GL and data lines DL formed on substrate SUB1 of a thin film transistor array TFTA to cross over each other, thin film transistors TFTs formed at crossings of the gate lines GL and the data lines DL, pixel electrodes Px formed in areas which are defined by crossings of the gate lines GL and the data lines DL, and common electrodes COM positioned opposite the pixel electrodes Px. In the modification of the first exemplary embodiment, the common electrodes COM also serve as touch non-sensing electrodes S1. Accordingly, the common electrodes COM are also referred to as touch non-sensing electrodes S1, touch non-sensing electrodes S1 also serving as common electrodes, or common electrodes COM also serving as touch non-sensing electrodes as appropriate.

In this configuration, a gate line G is formed on a substrate SUB, and a gate insulation layer GI is formed on top of the gate line GL. An active layer A, a source electrode S, and a drain electrode D which constitute a thin film transistor TFT are formed on the gate insulation layer GI.

The thin film transistor TFT comprises a gate electrode G extending from the gate line GL formed on the substrate SUB, an active layer A formed in an area corresponding to the gate electrode G on a gate insulation layer GI covering the gate line GL and the gate electrode G, a source electrode S that extends from a data line DL formed on the gate insulation layer GI and split to expose part of the active layer A, and a drain electrode D.

Although this embodiment has been described with respect to a thin film transistor having a gate bottom structure where a gate electrode is formed under source/drain electrodes, the present disclosure is not limited thereto and it should be understood that the present disclosure also involves a thin film transistor having a gate top structure where a gate electrode is formed over source/drain electrodes. The thin film transistor having a gate top structure is a well-known component, so a detailed description thereof will be omitted.

A first passivation layer PAS1 for covering the thin film transistor TFT and the data line DL is formed on the gate insulating layer GI where the thin film transistor TFT and the data line DL are formed. An organic insulation layer INS such as photoacryl for planarization is formed on the first passivation layer PAS1. First contact holes CH1 are formed in the organic insulation layer INS to expose the first passivation layer PAS1 in positions corresponding to part of the drain electrodes D.

Touch non-sensing electrodes S1 connected to each other by a bottleneck portion Sb and also serving as common electrodes COM are formed on the organic insulation layer INS with the first contact holes CH1. That is, two touch non-sensing electrodes S1 are in parallel with the data line DL, and formed on the organic insulation layer INS so as to be connected by at least one bottleneck portion Sb. A touch non-sensing electrode connecting wire Sc1 is formed on the touch non-sensing electrodes S1 to overlap the data line DL. The touch non-sensing electrode connecting wire Sc1 is disposed to pass through the bottleneck portion Sb.

A second passivation layer PAS2 is formed on the organic insulation layer INS where the touch non-sensing electrodes S1 and the touch non-sensing electrode connecting wire Sc1 are formed. Second contact holes CH2 exposing part of the drain electrodes D of the thin film transistors TFTs are formed in the first passivation layer PAS1, exposed via the first contact holes CH1 of the organic insulation layer INS, and the second passivation layer PAS2.

Pixel electrodes Px are formed on the second passivation layer PAS2 with the second contact holes CH2 in pixel areas defined by the crossings of data lines DL and gate lines GL. A touch sensing electrode connecting wire Rc1 is formed on the second passivation layer PAS2, in a direction (x-axis direction) parallel to the gate lines GL between two pixel electrodes Px adjacent to each other along the data lines DL, i.e., y axis. A touch sensing electrode Rx is formed in parallel with the gate lines on the second passivation layer PAS2 where the touch sensing electrode connecting wire Rc1 is formed, in order to cover the touch sensing electrode connecting wire Rc1. The touch sensing electrode Rx11 has a bottleneck portion in the region crossing the bottleneck portion Sb that connects neighboring touch non-sensing electrodes S1.

The pixel electrodes Px overlap the touch non-sensing electrodes S1. Each of the pixel electrodes Px comprises a plurality of slits SL to facilitate the formation of a horizontal electric field between the touch non-sensing electrodes S1, to which a common voltage is supplied, during a display driving operation. Accordingly, while the touch non-sensing electrodes S1 formed on the organic insulation layer INS are configured to have no slits, the pixel electrodes Px formed on the second passivation layer PAS2 are configured to have slits.

Figure 5A:
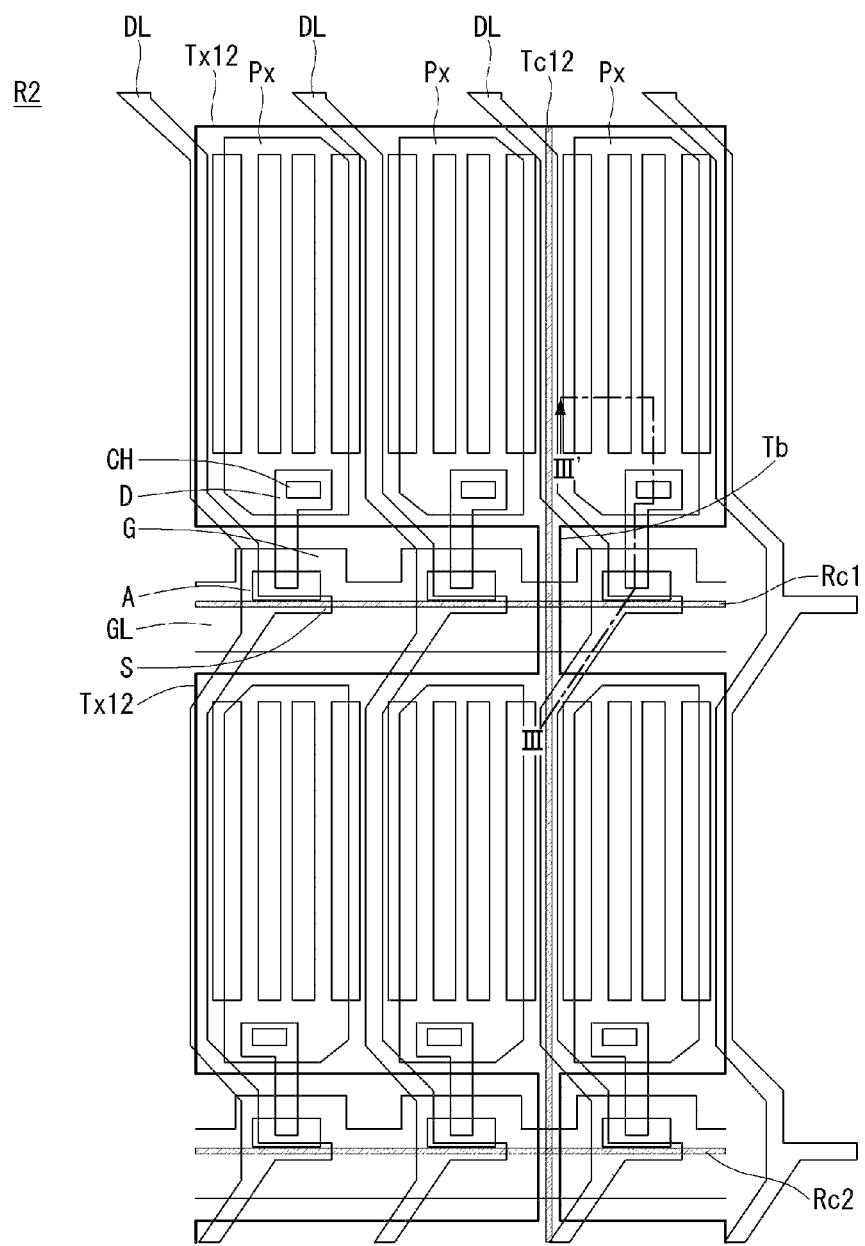
FIG. 5A is a top plan view illustrating an example where common electrodes overlie pixel electrodes in the area R2 of FIG. 2.
Figure 5B:
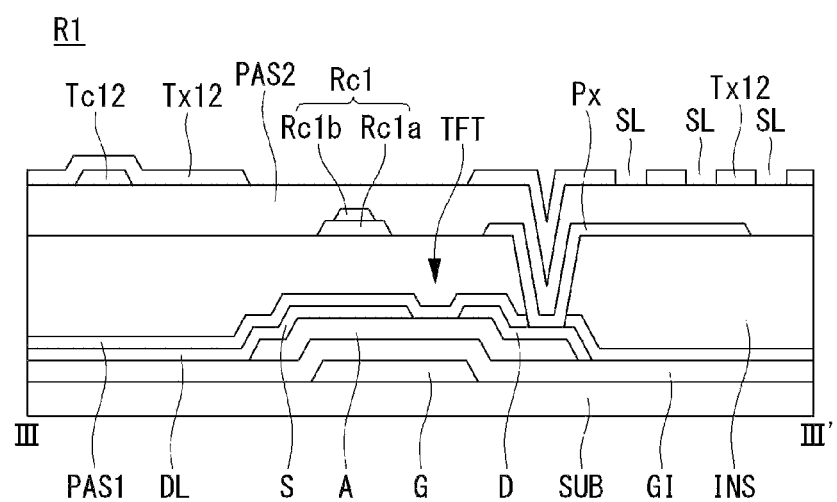
FIG. 5B is a cross-sectional view taken along the line III-III' of FIG. 5A.

Next, referring to FIGS. 5A and 5B, the touch sensor integrated type display device according to the first exemplary embodiment will be described with an example where common electrodes (touch driving electrodes) overlie pixel electrodes in the touch driving areas TA1 and TA2. FIG. 5A is a top plan view illustrating an example where common electrodes (touch driving electrodes) overlie pixel electrodes in the area R2 of FIG. 2. FIG. 5B is a cross-sectional view taken along the line III-III' of FIG. 5A.

Referring to FIG. 2 and FIGS. 5A and 5B, the touch sensor integrated type display device according to the first exemplary embodiment comprises gate lines GL and data lines DL formed on substrate SUB1 of a thin film transistor array TFTA to cross over each other, thin film transistors TFTs formed at crossings of the gate lines GL and the data lines DL, pixel electrodes Px formed in areas which are defined by crossings of the gate lines GL and the data lines DL, and common electrodes COM positioned opposite the pixel electrodes Px. In the first exemplary embodiment, the common electrodes COM also serve as touch driving electrode Tx12. Accordingly, the common electrodes COM are also referred to as touch driving electrodes Tx12, touch driving electrodes Tx12 also serving as common electrodes, or common electrodes COM also serving as touch driving electrodes as appropriate.

In this configuration, a gate line G is formed on a substrate SUB, and a gate insulation layer GI is formed on top of the gate line GL. An active layer A, a source electrode S, and a drain electrode D which constitute a thin film transistor TFT are formed on the gate insulation layer GI.

The thin film transistor TFT comprises a gate electrode G extending from the gate line GL formed on the substrate SUB, an active layer A formed in an area corresponding to the gate electrode G on a gate insulation layer GI covering the gate line GL and the gate electrode G, a source electrode S that extends from a data line DL formed on the gate insulation layer GI and split to expose part of the active layer A, and a drain electrode D.

Although this embodiment has been described with respect to a thin film transistor having a gate bottom structure where a gate electrode is formed under source/drain electrodes, the present disclosure is not limited thereto and it should be understood that the present disclosure also involves a thin film transistor having a gate top structure where a gate electrode is formed over source/drain electrodes. The thin film transistor having a gate top structure is a well-known component, so a detailed description thereof will be omitted.

A first passivation layer PAS1 for covering the thin film transistor TFT and the data line DL is formed on the gate insulating layer GI where the thin film transistor TFT and the data line DL are formed. An organic insulation layer INS such as photoacryl for planarization is formed on the first passivation layer PAS1. Contact holes CH are formed in the organic insulation layer INS and the first passivation layer PAS1 to expose part of the drain electrodes D.

Pixel electrodes Px are formed on the organic insulation layer INS in pixel areas defined by the crossings of data lines DL and gate lines GL. The pixel electrodes Px are brought into contact with the drain electrodes D of the thin film transistors TFT via the contact holes CH passing through the organic insulation layer INS and the first passivation layer PAST. A first layer Rc1a of a touch sensing electrode connecting wire Rc1 is formed on the organic insulation layer INS, and located between pixel electrodes Px adjacent to each other along the data lines (i.e., y axis), separated from the pixel electrodes Px. A second layer Rc1b is formed on the first layer Rc1a of the touch sensing electrode connecting wire Rc1, thereby allowing the touch sensing electrode connecting wire Rc1 to have a double-layered structure.

A second passivation layer PAS2 is formed on the organic insulation layer INS where the pixel electrodes Px and the touch sensing electrode connecting wire Rc1 are formed.

A touch driving electrode connecting wire Tc12 is formed on the second passivation layer PAS2 to overlap a data line DL. The touch driving electrode connecting wire Tc12 is disposed to cross a gate line GL.

Touch driving electrodes Tx12 also serving as common electrodes are formed on the second passivation layer PAS2 where the touch driving electrode connecting wire Tc12 is formed. The touch non-sensing electrodes S1 overlap the pixel electrodes Px. Each of the touch driving electrodes Tx12 comprises a plurality of slits SL to facilitate the formation of a horizontal electric field between the pixel electrodes Px during a display driving operation. Accordingly, while the pixel electrodes Px formed on the organic insulation layer INS are configured to have no slits, the touch driving electrodes Tx12 formed on the second passivation layer PAS2 are configured to have slits.

Figure 6A:
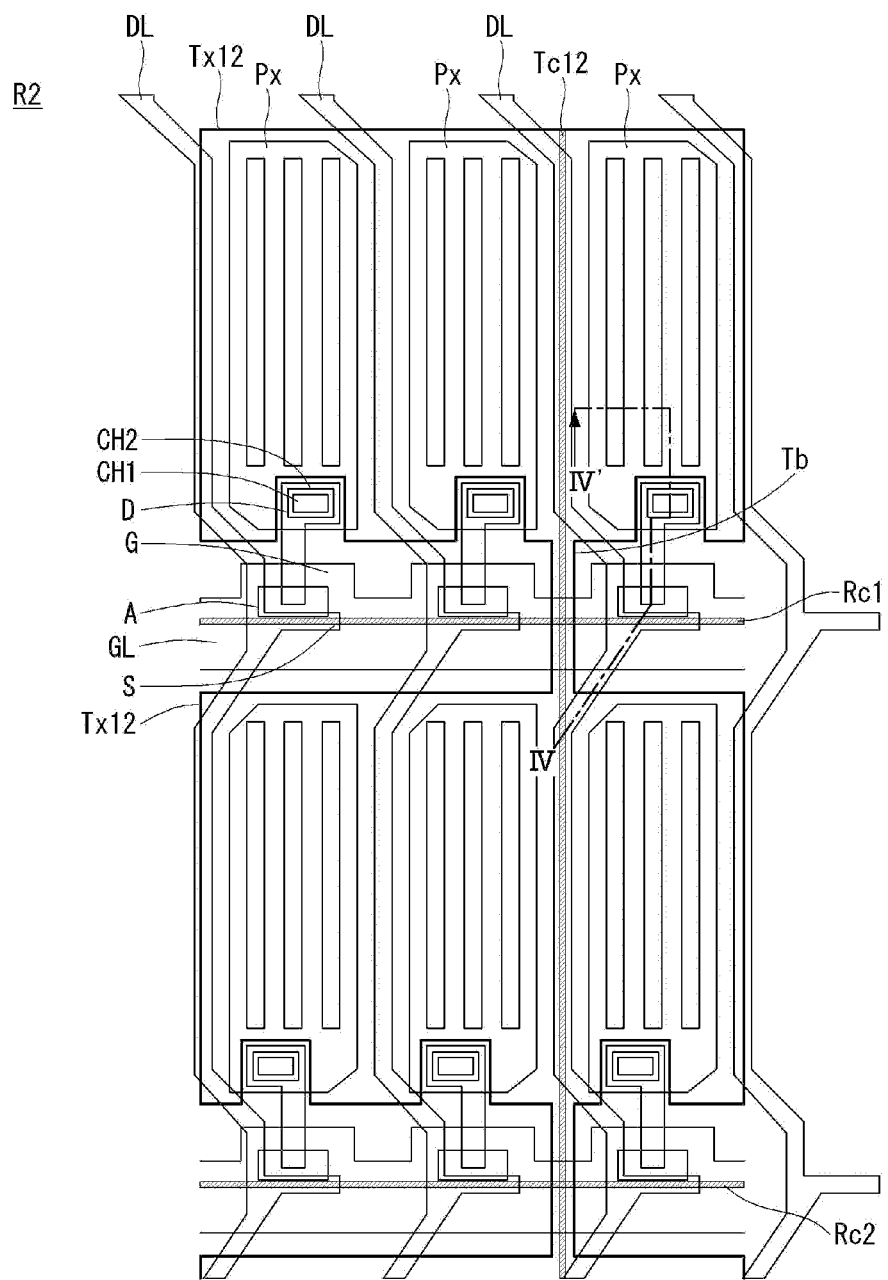
FIG. 6A is a top plan view illustrating an example where pixel electrodes overlie common electrodes (touch driving electrodes) in the area R2 of FIG. 2.
Figure 6B:
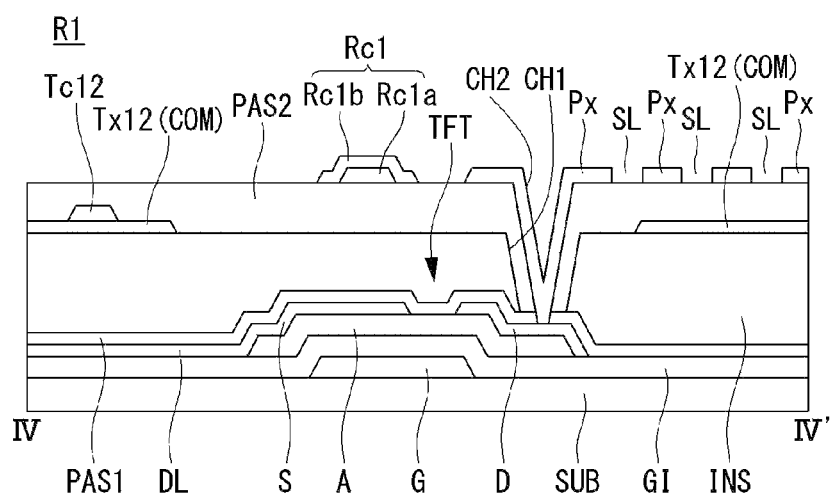
FIG. 6B is a cross-sectional view taken along the line IV-IV' of FIG. 6A.

Referring to FIGS. 6A and 6B, a touch sensor integrated type display device according to a modification of the second exemplary embodiment will be described with an example where pixel electrodes overlie common electrodes (touch non-sensing electrodes) in the touch driving areas TA1 to TA4. FIG. 6A is a top plan view illustrating an example where pixel electrodes overlie common electrodes (touch driving electrodes) in the area R2 of FIG. 2. FIG. 5B is a cross-sectional view taken along the line IV-IV' of FIG. 6A.

Referring to FIG. 2 and FIGS. 6A and 6B, the touch sensor integrated type display device according to the modification of the first exemplary embodiment comprises gate lines GL and data lines DL formed on substrate SUB1 of a thin film transistor array TFTA to cross over each other, thin film transistors TFTs formed at crossings of the gate lines GL and the data lines DL, pixel electrodes Px formed in areas which are defined by crossings of the gate lines GL and the data lines DL, and common electrodes COM positioned opposite the pixel electrodes Px. In the modification of the first exemplary embodiment, the common electrodes COM also serve as touch driving electrodes Tx12. Accordingly, the common electrodes COM are also referred to as touch driving electrodes Tx12, touch driving electrodes Tx12 also serving as common electrodes, or common electrodes COM also serving as touch driving electrodes as appropriate.

In this configuration, a gate line G is formed on a substrate SUB, and a gate insulation layer GI is formed on top of the gate line GL. An active layer A, a source electrode S, and a drain electrode D which constitute a thin film transistor TFT are formed on the gate insulation layer GI.

The thin film transistor TFT comprises a gate electrode G extending from the gate line GL formed on the substrate SUB, an active layer A formed in an area corresponding to the gate electrode G on a gate insulation layer GI covering the gate line GL and the gate electrode G, a source electrode S that extends from a data line DL formed on the gate insulation layer GI and split to expose part of the active layer A, and a drain electrode D.

Although this embodiment has been described with respect to a thin film transistor having a gate bottom structure where a gate electrode is formed under source/drain electrodes, the present disclosure is not limited thereto and it should be understood that the present disclosure also involves a thin film transistor having a gate top structure where a gate electrode is formed over source/drain electrodes. The thin film transistor having a gate top structure is a well-known component, so a detailed description thereof will be omitted.

A first passivation layer PAS1 for covering the thin film transistor TFT and the data line DL is formed on the gate insulating layer GI where the thin film transistor TFT and the data line DL are formed. An organic insulation layer INS such as photoacryl for planarization is formed on the first passivation layer PAS1. Contact holes CH are formed in the organic insulation layer INS and the first passivation layer PAS1 to expose part of the drain electrodes D.

Touch driving electrodes Tx12 connected to each other by a bottleneck portion Tb and also serving as common electrodes COM are formed on the organic insulation layer INS with the first contact holes CH1. That is, two touch driving electrodes Tx12 are in parallel with the data line DL, and formed on the organic insulation layer INS so as to be connected by at least one bottleneck portion Tb. A touch driving electrode connecting wire Tc12 is formed on the touch driving electrodes Tx12 to overlap the data line DL. The touch driving electrode connecting wire Tc12 is disposed to pass through the bottleneck portion Tb.

A second passivation layer PAS2 is formed on the organic insulation layer INS where the touch driving electrodes Tx12 and the touch driving electrode connecting wire Tc11 are formed. Second contact holes CH2 exposing part of the drain electrodes D of the thin film transistors TFTs are formed in the first passivation layer PAST, exposed via the first contact holes CH1 of the organic insulation layer INS, and the second passivation layer PAS2.

Pixel electrodes Px are formed on the second passivation layer PAS2 with the second contact holes CH2 in pixel areas defined by the crossings of data lines DL and gate lines GL.

A touch sensing electrode connecting wire Rc1 is formed on the second passivation layer PAS2, in a direction (x-axis direction) parallel to the gate lines GL between two pixel electrodes Px adjacent to each other along the data lines DL, i.e., y axis.

The pixel electrodes Px overlap the touch non-sensing electrodes S1. Each of the pixel electrodes Px comprises a plurality of slits SL to facilitate the formation of a horizontal electric field between the first and second touch driving electrodes Tx12, to which a common voltage is supplied, during a display driving operation. Accordingly, while the touch driving electrodes Tx12 formed on the organic insulation layer INS are configured to have no slits, the pixel electrodes Px formed on the second passivation layer PAS2 are configured to have slits.

Figure 7:
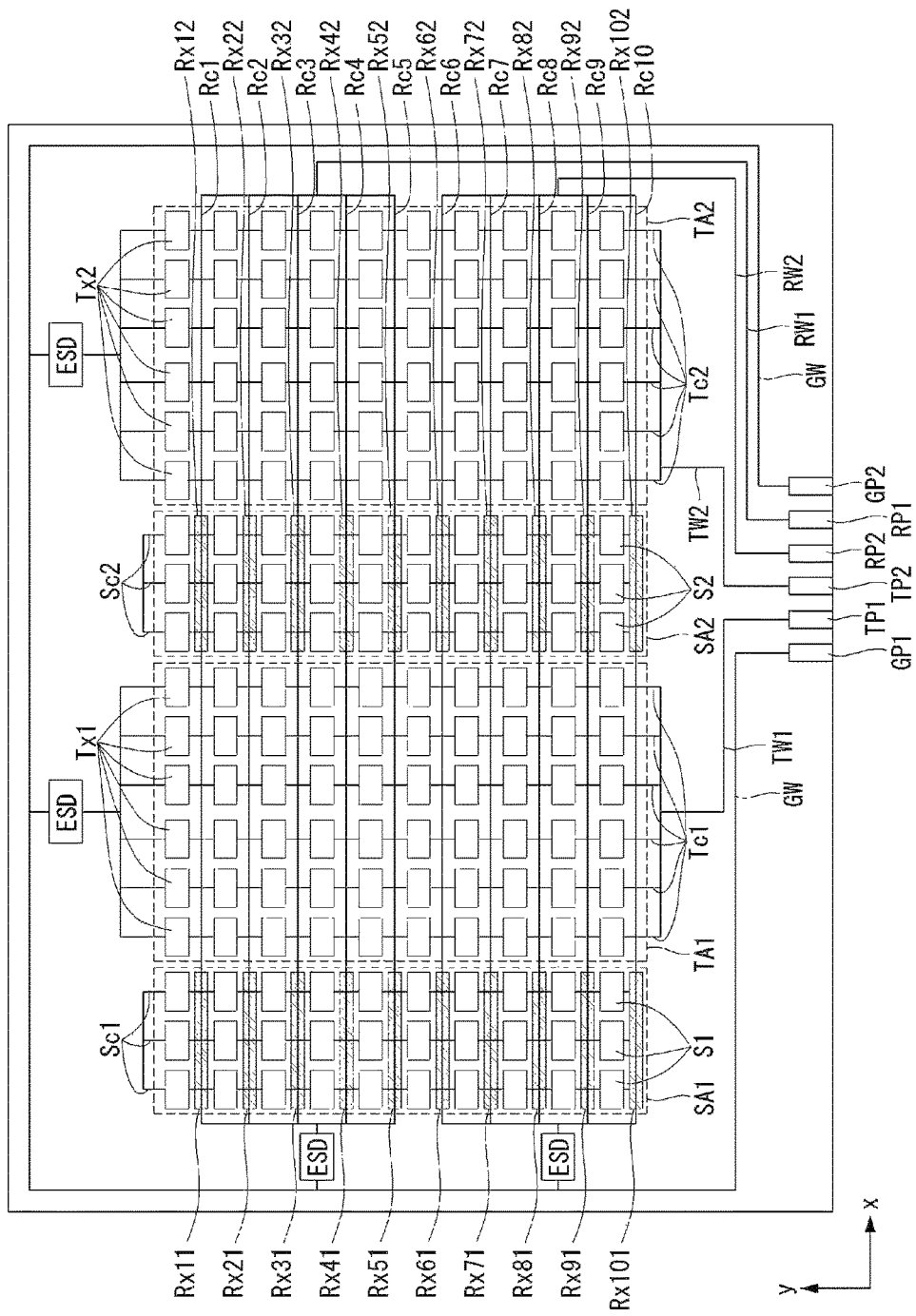
FIG. 7 is a top plan view schematically illustrating a touch sensor integrated type display device according to a second exemplary embodiment.

A touch sensor integrated type display device according to a second exemplary embodiment will be described with reference to FIG. 7. FIG. 7 is a top plan view schematically illustrating a touch sensor integrated type display device according to a second exemplary embodiment.

The touch sensor integrated type display device according to the second exemplary embodiment of the present invention is similar to the first exemplary embodiment except that the touch sensing areas and the touch driving areas are arranged in different manners, so only the differences will be described.

Referring to FIG. 7, common electrodes COM of the touch sensor integrated type display device according to the second exemplary embodiment comprise a plurality of electrodes Tx1, Tx2, S1, and S2 divided in a first direction (e.g., along the x axis) and a second direction (e.g., along the y axis). In the embodiment shown in FIG. 7, the divided common electrodes comprise four groups, i.e., first and second groups of touch driving electrodes Tx1 and Tx2 and two groups, i.e., first and second groups of touch non-sensing electrodes S1 and S2. The first and second groups of touch driving electrodes Tx1 and Tx2 are respectively located in first and second touch driving areas TA1 and TA2, and the first and second groups of touch non-sensing electrodes S1 and S2 are respectively located in first and second touch sensing areas SA1 and SA2.

The first touch driving area TA1 and the second touch driving area TA2 are the same size, and the first touch sensing area SA1 and the second touch sensing area TA2 are the same size. The first and second touch driving areas TA1 and TA2 are double the size of the first and second touch sensing areas SA1 and SA2. However, the present disclosure is not limited to having the first touch driving areas TA1 and TA2 being double the size of the first and second touch sending areas SA1 and SA2, and the first and touch driving areas TA1 and TA2 may be n times the size of the first and second touch sensing areas SA, where n is a natural number equal to or greater than 2.

The first and second touch driving areas TA1 and TA2 alternate with the first and second touch sensing areas SA1 and SA2. For example, the first touch driving area TA1 is located between the first touch sensing area SA1 and the second touch sensing area SA2, and the second touch sensing area SA2 is located between the first touch driving area TA1 and the second touch driving area TA2.

With this configuration, ten rows and six columns of first touch driving electrodes Tx1 are located in the first touch driving area TA1 are to form a first group of touch driving electrodes Tx1. Touch driving electrode connecting wires contacting the six columns of first touch driving electrodes Tx1 are arranged along the y axis in the first touch driving area TA1. That is, six columns of first touch driving electrode connecting wires Tc1 respectively contacting the six columns of first touch driving electrodes Tx1 are arranged along the y axis.

Ten rows and six columns of second touch driving electrodes Tx2 are located in the second touch driving area TA2 are to form the second group of touch driving electrodes Tx2. Touch driving electrode connecting wires contacting the six columns of second touch driving electrodes Tx2 are arranged along the y axis in the second touch driving area TA2. That is, six columns of second touch driving electrode connecting wires Tc2 respectively contacting the six columns of second touch driving electrodes Tx2 are arranged along the y axis.

Ten rows and three columns of first touch non-sensing electrodes S1 are located in a first touch sensing area SA1 to form the first group of touch non-sensing electrodes S1. First touch non-sensing electrode connecting wires contacting the three columns of first touch non-sensing electrodes S1 are arranged along the y axis in the first touch sensing area SA1. That is, three columns of first touch non-sensing electrode connecting wires Sc1 respectively contacting the three columns of first touch non-sensing electrodes S1 are arranged along the y axis. Also, the ten rows of first touch non-sensing electrodes S1 alternate with ten rows of first touch sensing electrodes Rx11, Rx21, Rx31, ..., Rx101 in the first touch sensing area SA1, and first to tenth touch sensing electrode connecting wires Rc1 to Rc10 respectively contacting the ten rows of first touch sensing electrodes Rx11, Rx21, Rx31, ..., Rx101 are arranged along the x axis.

Ten rows and three columns of second touch non-sensing electrodes S2 are located in the second touch sensing area SA2 to form a second group of touch non-sensing electrodes S2. Second touch non-sensing electrode connecting wires contacting the three columns of second touch non-sensing electrodes S2 are arranged along the y axis in the second touch sensing area SA2. That is, three columns of second touch non-sensing electrode connecting wires Sc2 respectively contacting the three columns of second touch non-sensing electrodes S2 are arranged along the y axis. Also, the ten rows of second touch non-sensing electrodes S2 alternate with ten rows of second touch sensing electrodes Rx12, Rx22, Rx32, ..., Rx102 in the second touch sensing area SA2, and the first to tenth touch sensing electrode connecting wires Rc1 to Rc10 respectively contacting the ten rows of second touch sensing electrodes Rx12, Rx22, Rx32, ..., Rx102 are arranged along the x axis.

As shown in FIG. 7, the first to tenth touch sensing electrode connecting wires Rc1 to Rc10 arranged to extend from the first and second touch sensing areas SA1 and SA2 to the first and second touch driving electrodes TA1 and TA2.

With this configuration, the six columns of first touch driving electrodes Tx1 located in the first touch driving area TA1 are connected to a first touch driving routing wire TW1 by a connecting portion that interconnects ends of the six columns of first touch driving electrode connecting wires Tc1 contacting the six columns of first touch driving electrodes Tx1. The other ends of the first touch driving electrode connecting wires Tc1 are connected to each other and then connected to a ground wire GW via an electrostatic discharge circuit ESD.

The six columns of second touch driving electrodes Tx2 located in the second touch driving area TA2 are connected to a second touch driving routing wire TW2 by a connecting portion that interconnects ends of the six columns of second touch driving electrode connecting wires Tc2 contacting the six columns of second touch driving electrodes Tx2. The other ends of the second touch driving electrode connecting wires Tc2 are connected to each other and then connected to the ground wire GW via another electrostatic discharge circuit ESD.

The first and second touch driving routing wires TW1 and TW2 are connected to first and second touch driving routing pads TP1 and TP2, respectively, and supply a touch driving voltage to the first and second touch driving electrodes Tx1 and Tx2.

In the embodiment shown in FIG. 7, touch driving electrodes are illustrated taking as an example a first touch driving line including the first touch driving electrodes Tx1 and the first driving electrode connecting wires Tc1 and a second touch driving line including the second touch driving electrodes Tx2 and the second driving electrode connecting wires Tc2. The embodiment shown in FIG. 7 is merely exemplary, and the number of touch driving lines may be determined as needed by adjusting the number of touch driving electrode connecting lines connected by a connecting portion.

The first touch non-sensing electrodes S1 located in the first touch sensing area SA1 are connected to the ground wire GW by a connecting wire that interconnects ends of the first touch non-sensing electrode connecting wires Sc1 contacting the first touch non-sensing electrodes S1. The second touch non-sensing electrodes S2 located in the second touch sensing area SA2 are connected to the ground wire GW after ends of the second touch non-sensing electrode connecting wires Sc2 contacting the second touch non-sensing electrodes S2 are interconnected.

The first to fifth touch sensing electrodes Rx11 and Rx12; Rx21 and Rx22; Rx31 and Rx32; Rx41 and Rx42; and Rx51 and Rx52 are connected to a first touch sensing routing wire RW1 by a connecting portion that interconnects ends of the first to fifth touch sensing electrode connecting wires Rc1 to Rc5 contacting the first to fifth touch sensing electrodes Rx11 and Rx12; Rx21 and Rx22; Rx31 and Rx32; Rx41 and Rx42; and Rx51 and Rx52. The other ends of the first to fifth touch sensing electrode connecting wires Rc1 to Rc5 are connected together and then connected to the ground wire GW via yet another electrostatic discharge circuit ESD.

The sixth to tenth touch sensing electrodes Rx61 and Rx62; Rx71 and Rx72; Rx81 and Rx82; Rx91 and Rx92; and Rx101 and Rx102 are connected to a second touch sensing routing wire RW2 by a connecting portion that interconnects ends of the sixth to tenth touch sensing electrode connecting wires Rc6 to Rc10 contacting the sixth to tenth touch sensing electrodes Rx61 and Rx62; Rx71 and Rx72; Rx81 and Rx82; Rx91 and Rx92; and Rx101 and Rx102. The other ends of the sixth to tenth touch sensing electrode connecting wires Rc6 to Rc10 are connected together and then connected to the ground wire GW via a further electrostatic discharge circuit ESD.

The first and second touch sensing routing wires RW1 and RW2 are respectively connected to first and second touch sensing routing pads RP1 and RP2, and supply a sensing voltage from the first to fifth touch sensing electrodes Rx11 and Rx12; Rx21 and Rx22; Rx31 and Rx32; Rx41 and Rx42; and Rx51 and Rx52 and the sixth to tenth touch sensing electrodes Rx61 and Rx62; Rx71 and Rx72; Rx81 and Rx82; Rx91 and Rx92; and Rx101 and Rx102 to a touch processor (not shown) via the first to tenth touch sensing electrode connecting wires Rc1 to Rc5 and Rc6 to Rc10.

In the embodiment shown in FIG. 7, touch sensing electrodes are illustrated taking as an example two touch sensing lines including a first touch sensing line including the first to fifth touch sensing electrodes Rx11 and Rx12; Rx21 and Rx22; Rx31 and Rx32; Rx41 and Rx42; and Rx51 and Rx52 and the fifth to fifth touch sensing electrode connecting wires Rc1 to Rc5 and a second touch sensing line including the sixth to tenth touch sensing electrodes Rx61 and Rx62; Rx71 and Rx72; Rx81 and Rx82; Rx91 and Rx92; and Rx101 and Rx102 and the sixth to tenth touch sensing electrode connecting wires Rc6 to Rc10. The embodiment shown in FIG. 7 is merely exemplary, and the number of touch sensing lines may be determined as needed by adjusting the number of touch sensing electrode connecting lines connected by a connecting portion.

Both of the above-explained touch driving electrodes Tx1 and Tx2 and the touch non-sensing electrodes S1 and S2 also function as common electrodes COM. In a horizontal electrical field type display device, these electrodes are formed, along with pixel electrodes Px, on the first substrate SUB1 of the thin film transistor array TFTA, and the pixel electrodes Px are formed in areas defined by the crossings of the gate lines and the data lines.

The touch driving electrodes Tx1 and Tx2 and the touch non-sensing electrodes S1 and S2 both functioning as common electrodes COM are formed to correspond to unit pixel electrodes, respectively, (each including a plurality of subpixels used to represent colors: three subpixels in an embodiment)

The relationship between the touch non-sensing electrodes, touch driving electrodes, and pixel electrodes in the touch sensing areas and the touch driving areas according to the second exemplary embodiment of the present invention is substantially identical to the first exemplary embodiment of the present invention, so further description will be omitted.

The above-described touch sensor integrated type display devices according to the first and second exemplary embodiments and their modifications have the advantage of facilitating the design of touch driving electrodes, touch sensing electrodes, and wiring which constitute a touch sensor, in conformity with the design of unit pixel electrodes, gate lines, and data lines of the display device.

Furthermore, the touch sensor integrated type display devices have the advantage of being beneficial to high-resolution products and large-area products by improvement in aperture ratios because no contact holes for connecting touch driving electrodes and touch sensing electrodes are needed.

Furthermore, the touch sensor integrated type display devices have the advantage of improving touch performance since touch sensing electrodes are not located in a touch driving area and electrostatic capacitance and parasitic capacitance therefore can be decreased due to the reduction in the number of touch sensing electrodes.

Furthermore, the touch sensor integrated type display devices have the advantage of increasing the stability of the device because static electricity coming from outside can be cut off by connecting touch driving electrodes and touch sensing electrodes to an electrostatic discharge circuit.

Those skilled in the art will recognize, after review of the foregoing detailed description, that variations and modifications are possible without departing from the spirit of the invention.

While the pixel electrode located corresponding to each of the touch sensing electrodes and the touch non-sensing electrodes has been illustrated as a unit pixel electrode, the present disclosure is not limited to this. For example, it is possible for a plurality of unit pixel electrodes to be disposed corresponding to each of the touch sensing electrodes and the touch non-sensing electrodes Moreover, the touch driving electrodes explained in the above-described exemplary embodiments may be embodied as touch sensing electrodes or vice versa according to a modification.

In addition, while the exemplary embodiments have been described taking an example where a first passivation film for thin film transistor protection and an organic insulation film for planarization are formed separately, either the first passivation layer or the organic insulation layer alone may perform the two functions.

Further, the second exemplary embodiment has been described taking an example where the touch driving area are double the size of the touch sensing area, the present invention is not limited to this and the touch driving area may be n times the size of the touch sensing area (n is a natural number equal to or greater than 2). Accordingly, the technical scope is not limited to the detailed description of the specification, but should be defined by the accompanying claims.

What is claimed is:

1. A touch sensor integrated type display device comprising:
a plurality of first areas including a plurality of first rows of touch driving electrodes, each first row including a plurality of touch driving electrodes; and
a plurality of second areas including:
a plurality of second rows of touch non-sensing electrodes, each second row including a plurality of touch non-sensing electrodes, and
a plurality of touch sensing electrodes,
wherein the plurality of second rows and the plurality of touch sensing electrodes are arranged alternately in a first direction so as to avoid contact with each other, the first areas and the second areas being arranged in a second direction different from the first direction, wherein at least one second area of the plurality of second areas is between and adjacent to at least two first areas of the plurality of first areas;

wherein at least one touch sensing electrode of the plurality of touch sensing electrodes is between and adjacent to at least two second rows of touch non-sensing electrodes of the plurality of touch non-sensing electrodes, wherein at least one second row of touch non-sensing electrodes of the plurality of second rows of touch non-sensing electrodes is between and adjacent to at least two touch sensing electrodes of the plurality of touch sensing electrodes, and wherein the plurality of touch driving electrodes located in the plurality of first areas are connected to each other in the first direction, the plurality of touch non-sensing electrodes located in the plurality of second areas are connected to each other in the first direction, and the plurality of touch sensing electrodes located in the plurality of second areas are connected to each other in the second direction crossing the first direction.

2. The touch sensor integrated type display device of claim 1, wherein the plurality of first areas and the plurality of second areas are of a same size.

3. The touch sensor integrated type display device of claim 2, wherein the touch driving electrodes located in at least the two first areas are connected to a touch routing wire, and the plurality of touch non-sensing electrodes located in the plurality of second areas are connected to each other and grounded.

4. The touch sensor integrated type display device of claim 3, wherein the plurality of touch driving electrodes located in the plurality of first areas are connected to each other via a plurality of first connecting wires which are arranged to be in contact with the plurality of touch driving electrodes, and the plurality of touch non-sensing electrodes located in the plurality of second areas are connected to each other via a plurality of second connecting wires which are arranged to be in contact with the plurality of touch non-sensing electrodes.

5. The touch sensor integrated type display device of claim 4, wherein the plurality of touch sensing electrodes located in the plurality of second areas are connected to each other to form at least two electrically separated groups via a plurality of third connecting wires which are arranged to be in contact with the plurality of touch sensing electrodes, and the plurality of third connecting wires are arranged to cross the plurality of first and second connecting wires.

6. The touch sensor integrated type display device of claim 1, wherein the plurality of first areas and the plurality of second areas are arranged alternately, and the plurality of first areas are larger in size that the plurality of second areas.

7. The touch sensor integrated type display device of claim 6, wherein the plurality of touch driving electrodes located in the plurality of first areas are connected to a touch routing wire, and the plurality of touch non-sensing electrodes located in the plurality of second areas are grounded.

8. The touch sensor integrated type display device of claim 7, wherein a plurality of first connecting wires connected to the plurality of touch driving electrodes located in the plurality of first areas which are located between the plurality of second areas are connected to each other via a fourth connecting wire, and a plurality of second connecting wires connected to the plurality of touch non-sensing electrodes located in the plurality of second areas are connected to each other via a fifth connecting wire.

9. The touch sensor integrated type display device of claim 8, wherein a plurality of third connecting wires connected to the plurality of touch sensing electrodes located in the plurality of second areas are connected to each other to form at least two electrically separated groups via a sixth connecting wire, and the sixth connecting wire is arranged to cross the fourth and fifth connecting wires.

10. The touch sensor integrated type display device of claim 1, wherein the plurality of touch driving electrodes also serve as common electrodes, and the plurality of touch non-sensing electrodes also serve as common electrodes.

11. The touch sensor integrated type display device of claim 1, further comprising at least one unit pixel electrode that overlaps each of the plurality of first and touch non-sensing electrodes, the unit pixel electrode including a plurality of subpixel electrodes for representing colors.

12. The touch sensor integrated type display device of claim 1, wherein:
the plurality of touch driving electrodes function as either touch driving electrodes or common electrodes;
the plurality of touch non-sensing electrodes function as either non-sense electrodes or common electrodes; and
the plurality of touch sensing electrodes function as sense electrodes.

13. The touch sensor of claim 1, wherein at least two first areas of the plurality of first areas are adjacent to each other along the second direction.

14. The touch sensor of claim 1, wherein at least one first area of the plurality of first areas is in between and adjacent to another first area of the plurality of first areas and one second area of the plurality of second areas along the second direction.

15. The touch sensor of claim 1, wherein the plurality of touch driving electrodes are same as the plurality of touch non-sensing electrodes and different from the plurality of touch sensing electrodes in their shapes.

16. The touch sensor of claim 1, further including:
a first electrostatic discharge circuit coupled to the plurality of touch driving electrodes; and
a second electrostatic discharge circuit coupled to the plurality of touch sensing electrodes.

17. The touch sensor of claim 1, wherein the plurality of touch driving electrodes located in the plurality of first areas are connected to each other via a plurality of touch driving connecting wires which are arranged to be in contact with the plurality of touch driving electrodes, the plurality of touch non-sensing electrodes are connected to each other via a plurality of touch non-sensing connecting wires which are arranged to be in contact with the plurality of touch non-sensing electrodes, and the plurality of touch sensing electrodes are connected to each other via a plurality of touch sensing connecting wires which are arranged to be in contact with the plurality of touch sensing electrodes, and
wherein the touch non-sensing connecting wire is disposed to pass through a bottleneck portion of the touch sensing electrodes which is narrow in width.

\* \* \* \* \*